June 14, 1960  H. SHERMAN, JR  2,941,116
CATHODE-RAY TUBE FOR RADAR SCOPES AND THE LIKE
Filed June 15, 1953  4 Sheets-Sheet 1
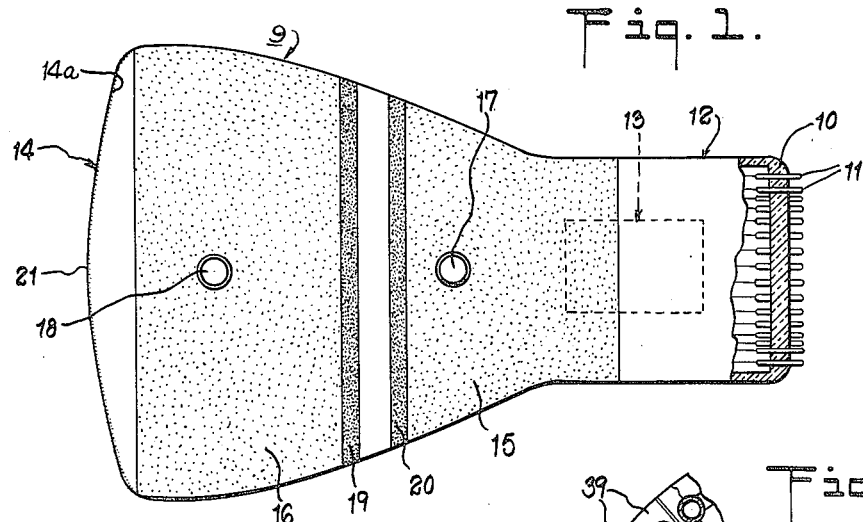
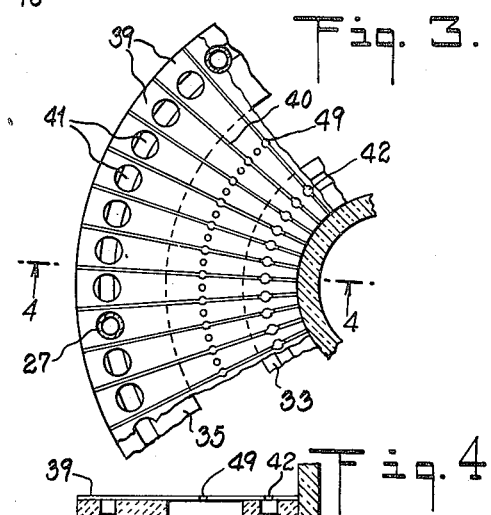
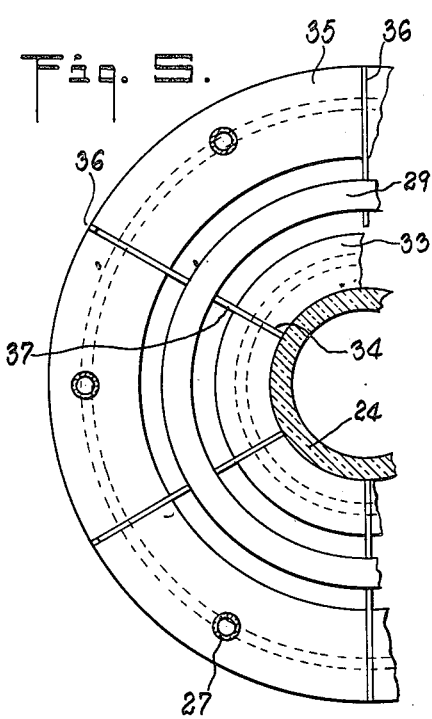
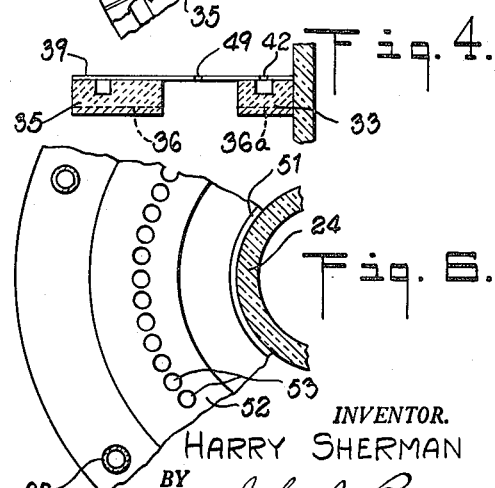
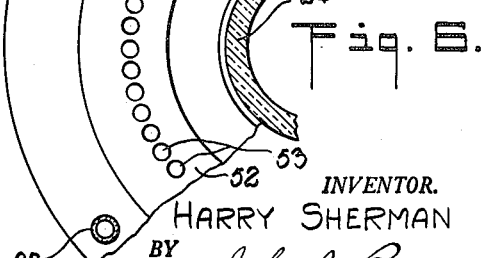
INVENTOR.
HARRY SHERMAN
BY John J. Rogan
ATTORNEY

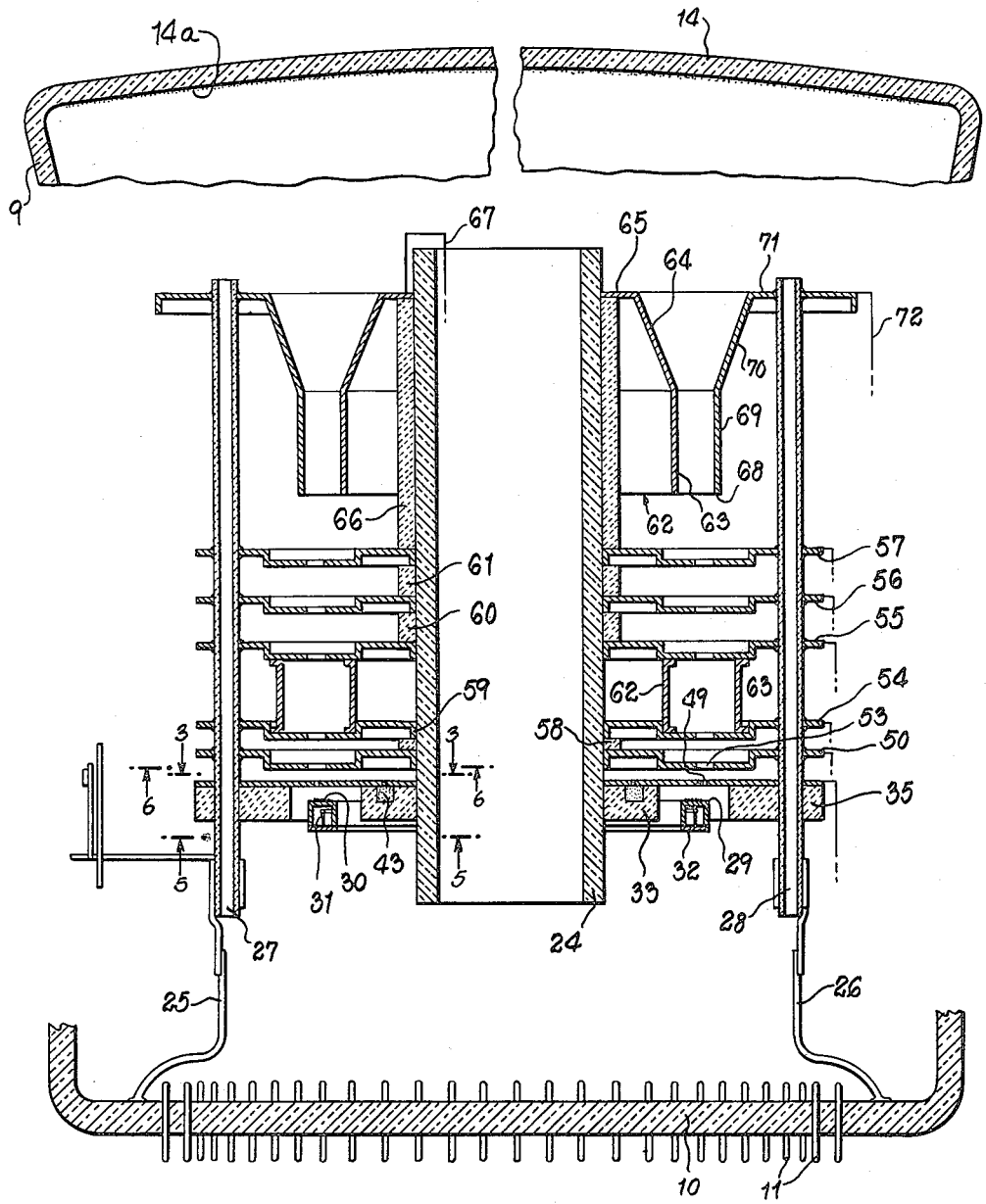

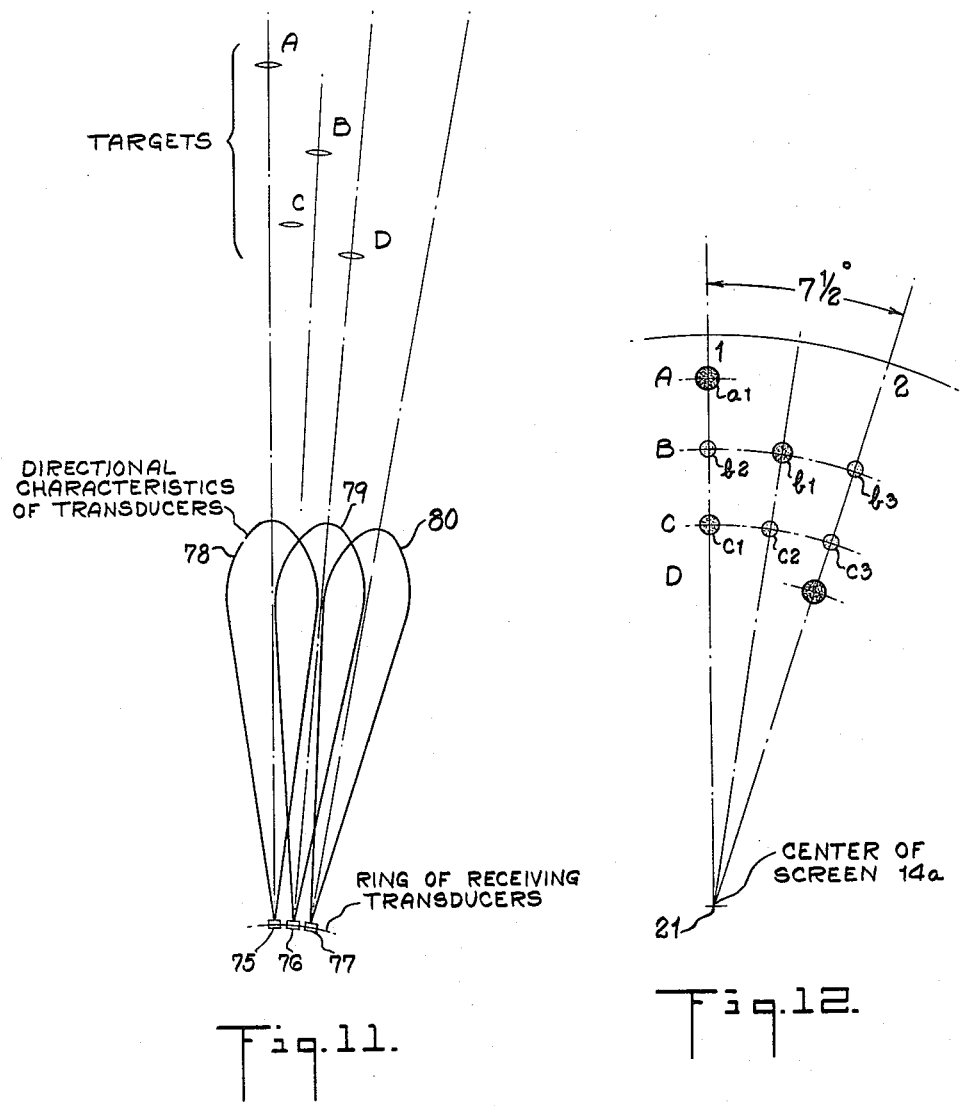

June 14, 1960  H. SHERMAN, JR  2,941,116
CATHODE-RAY TUBE FOR RADAR SCOPES AND THE LIKE
Filed June 15, 1953  4 Sheets-Sheet 4

INVENTOR.
HARRY SHERMAN
BY
John J. Rogan
ATTORNEY

United States Patent Office 2,941,116
Patented June 14, 1960

2,941,116

CATHODE-RAY TUBE FOR RADARSCOPES AND THE LIKE

Harry Sherman, Jr., Bloomfield, N.J., assignor to National Union Electric Corporation, a corporation of Delaware Filed June 15, 1953, Ser. No. 361,560

12 Claims. (Cl. 315—13)

This invention relates to cathode-ray tubes and more especially it relates to tubes especially designed for sonar, radar and similar indicating or display systems.

A principal object of the invention is to provide an improved cathode-ray tube for displaying indications of the polar coordinate type.

Another object is to provide a novel cathode-ray tube for use in radar or sonar systems where sequential azimuthal scanning is avoided.

A feature of the invention relates to a cathode-ray tube having simplified means to develop a multiplicity of discrete cathode-ray beams disposed in circular array, in conjunction with novel deflector means common to all the beams for individually controlling their radial positions.

Another feature relates to a novel cathode-ray tube of the plan-position-indicator type such as used in radar or sonar systems, and employing a plurality of beam-developing means including a series of circumferentially spaced grid elements each energized in correspondence with a corresponding discrete bearing to be displayed; and designed to interpolate bearing means between said adjacent discrete bearings.

A further feature relates to a novel cathode-ray tube for radar or sonar systems and the like employing a ring cathode, an annular grid system formed of a multiplicity of radially extending but circumferentially spaced grid segments. The grid segments are designed and arranged so as to develop twice as many focused beams as there are grid segments, and in conjunction with an annularly cylindrical deflector system common to all the beams for controlling their respective radial deflections over a luminescent screen.

A still further feature relates to the novel organization, arrangement and relative location and interconnection of parts which cooperate to provide an improved polar coordinate cathode-ray tube.

Other features and advantages not particularly enumerated, will become apparent after a consideration of the following detailed descriptions and the appended claims.

Fig. 1 is a longitudinal plan view of a cathode-ray tube according to the invention, with part of the bulb broken away.

Fig. 2 is an enlarged longitudinal sectional view of the multi-gun mount located within the tube of Fig. 1.

Fig. 3 is a sectional view along line 3—3 of Fig. 2.

Fig. 4 is a sectional view of Fig. 3 along line 4—4 thereof.

Fig. 5 is a sectional view of Fig. 2, taken along the line 5—5 thereof.

Fig. 6 is a sectional view of Fig. 2, taken along the line 6—6 thereof.

Fig. 11 is a schematic diagram showing the relation between the field directional sensitivity patterns of the receiving transducers and three distant objects at different ranges and bearings and as represented by the corresponding displays in Fig. 7.

Fig. 12 is an enlarged view of a different visual display for the location of the objects illustrated in Fig. 11.

As is well-known in cathode-ray tube indicators used in radar or sonar systems and the like, the visual display is in the form of a luminescent spot whose angular position around the center of the screen represents the angular bearing of a distant object with respect to a fixed point and whose radial position from that center represents the range or distance of the object. In the conventional radarscope, the indicating spot is produced by a single focused cathode-ray beam under control of a corresponding single control grid which is sequentially energized or pulsed for each angular bearing being scanned. Such a system has certain disadvantages including, for example, the "noise" voltage introduced by the relatively rapid scanning movement of the single beam; and the fact that the beam must be subjected to a spiral scanning pattern. It has been proposed, instead of using a single search antenna to employ a series of fixed search antennas which are equally distributed around a common point in a circular array. The present invention finds its main utility in connection with a system of that type wherein a series of search or pick-up antennas, for example forty-eight, are arranged in a circular array and are connected to the scope according to the invention.

Figure 7:
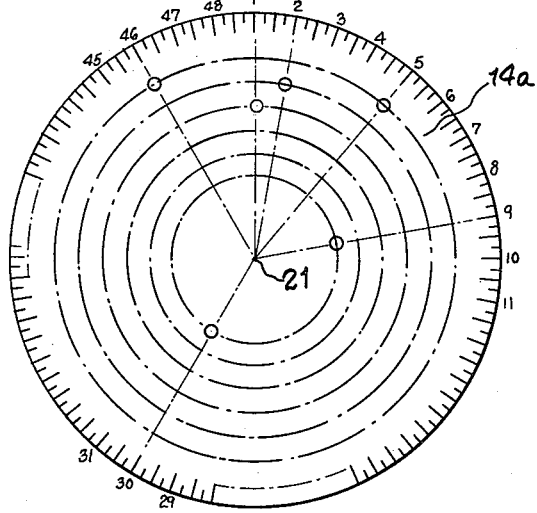
Fig. 7 is a view of a visual display on the screen end of the tube according to the invention.

As shown in Fig. 1 of the drawing, the scope comprises any well-known shape of cathode-ray tube bulb or envelope 9 sealed to the glass header 10 through which the various lead-in wires 11 are connected. Suitably mounted within the neck portion 12 of the bulb is an electrode mount indicated schematically by the block 13 and shown in magnified sectional view in Fig. 2. The opposite enlarged end wall 14 of the bulb contains the usual luminescent or phosphorescent screen 14a which produces a visual display when bombarded by cathode rays from the mount 13. The inside surface of the glass wall of the bulb is provided with two conductive coatings 15, 16, each having a suitable connector button 17, 18, in contact therewith so that external contact can be made to the coatings. Preferably, the spaced adjacent edges of the coatings 15 and 16 have intervening strips 19, 20, to reduce the electric current leakage between the two coatings. As shown in Fig. 7, the screen 14 may be marked off exteriorly of the bulb with suitable bearing or azimuth markings, or if desired a separate translucent shield can be mounted adjacent the screen end 14 and this shield can be provided with the desired azimuth markings.

The particular tube to be described is designed to produce at least ninety-six significant bearing indications around the center point 21. However, the system is so arranged that only half that number of control elements or grids are necessary and the grids are designed and arranged so as to interpolate between adjacent grids to provide the additional bearing indications.

Referring more particularly to Figs. 2 and 5, the header 10 has sealed therein a series of six support rods 25, 26, etc., these rods being equally spaced circumferentially from each other and at the same radial distance from the center of the header 10. Vertically supported from each of the six rods 25, 26, etc., is a corresponding ceramic rod or tube 27, 28, etc. The six ceramic rods 27, 28, 35c serve as the anchoring and centering supports both for the member 24 and for the various electrodes of the multi-gun system, as will be described.

Symmetrically surrounding the member 24 is an annular metal box-like member 29, whose external upper surface is provided with a coating 30 of any well-known electron-emissive material, such as is used for indirectly heated cathodes. For the purpose of heating this material to emissive temperature, there is mounted within the box 29 any suitable form of heater wire or element 31 which may consist of a multi-coil insulated resistance wire whose terminals (not shown) are connected to a corresponding pair of the lead-in members 11, to which heating current is applied. Preferably the lower open end of the box 29 is closed by a metal cover plate 32.

For the purpose of supporting this annular box-like cathode, there is provided an inner ceramic ring 33, having a series of six equally spaced radial grooves 34 in the bottom face thereof. The ring 33 is cemented to the glass member 24. Another ceramic ring 35 of larger internal diameter than ring 33 has a series of six equi-spaced openings through which the ceramic support rods 27, 28, etc., pass and to which the ring 35 is cemented. The lower face of ring 35 is also provided with a series of six equi-spaced grooves 36 in radial alignment with the grooves 34. Six metal rods 37 are cemented in the aligned radial grooves 34 and 36. These rods pass freely through the inner and outer walls of the cathode box member 29. This permits the cathode assembly to expand and contract radially while supporting the said assembly accurately with respect to the rest of the mount. It will be understood, of course, that the metal rods 37 while passing through the cathode box do not conductively engage the heater wire 31, it being understood, of course, that the said heater wire is supported in the box 29 by suitable insulating supports, while the ends of the heater wire are brought out through suitable insulating beads or eyelets in the cover plate 32. With this arrangement, therefore, the cathode assembly can expand in diameter without distortion since the cathode assembly can slide radially along each of the wires 37 while remaining coaxial with the rest of the mount.

Cemented to the corresponding upper faces of the ceramic rings 33 and 35 are forty-eight flat metal strips or radially extending segments 39. These adjacent grid strips are spaced from each other by minute gaps as indicated by the numeral 40 (Fig. 3) and they are cemented to the ceramic rings 33, 35. In order to improve the cemented bond, each of the grid strips adjacent its outer end has a circular opening 41 to receive a suitable ceramic cement. Likewise, each of the strips adjacent its inner end but on opposite edges thereof is provided with a semicircular cut-out 42, so that the adjacent edges of adjacent strips define circular openings into which the ceramic cement 43 can be applied. Preferably the upper face of ceramic ring 33 has an annular groove 44 in circumferential alignment with these openings in the grid strips to receive the ceramic cement.

Figure 8:
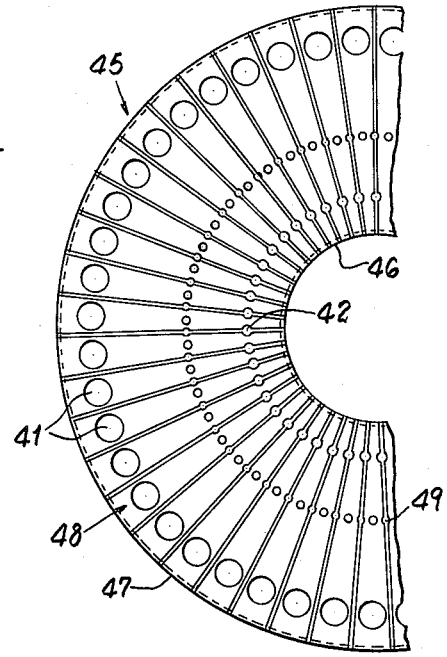
Figs. 8 and 9 are views of the metal blank from which the multi-grid strips are formed.
Figure 9:
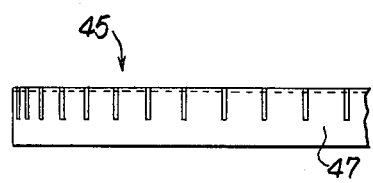

In order to insure that the grid strips 39 are properly and permanently spaced and insulated from each other they are formed from an annular disc-shaped metal blank 45 (Figs. 8 and 9). This blank has a cylindrical inner wall 46 of the same diameter as the external diameter of the member 24; and an outer cylindrical wall 47 of the same diameter as the outer diameter of the ceramic ring 35. The top face 48 of the blank is flat and is provided with an outer circular row of cement-receiving perforations 41 and an inner circular row of cement-receiving perforations 42. A third circular row of grid perforations 49 are provided in the top 48. These perforations 49 are arranged on a circle which is located between the spaced rings 33, 35, as shown in Figs. 2, 3 and 4. Since it has been assumed that the tube is provided with forty-eight of these grid strips 37, the top face 48 is provided with ninety-six perforations 49 which form the ninety-six grid apertures, as will be described hereinbelow. When the perforated blank 45 has been fitted over the rings 33 and 35 and cemented thereto, the cement also fills the perforations 41 and 42 to provide a more positive anchoring of the grid strips to the ceramic rings. It will be understood, of course, that six of the perforations 41 are not filled in with cement since they are to provide through passageways for the ceramic supporting rods 27, 28, etc. as above mentioned. It will also be observed that the cement 43 which fills the groove in the ring 33 also fills the openings 42, thus anchoring each of the grid strips at two separate points throughout its length.

The blank 45 prior to being fitted over the rings 33 and 35, has forty-eight slots 40 cut therein, thus dividing the top face 48 into forty-eight equal grid sectors and with the central line of each slot 40 extending through the center of the corresponding grid perforation 49. These slots are also extended down part way along the walls 46 and 47, as shown in Figs. 8 and 9. After the blank has been cemented in place, the walls 46 and 47 are cut off, thus leaving the forty-eight grid strips firmly fastened to the ceramic rings. Thus, the ninety-six grid perforations 49 are in circumferential registry with the cathode coating 30 on the cathode 29. It will be observed that forty-eight of the grid perforations are formed, each respectively in the body of a corresponding grid strip 39, while the remaining forty-eight grid perforations are provided in the form of notches located between the adjacent edges of adjacent grid strips. These latter grid perforations serve as interpolation grid controls, as will be described in connection with Fig. 11.

Mounted in spaced relation to the grid strips is an annular metal ring electrode 50, a portion of which is shown in enlarged form in Fig. 6. It consists of a metal sheet having an internal circumferential flange 51 which closely fits around the glass member 24. The margin of ring 50 has six openings to receive the six ceramic support rods 27, 28, etc., to which the ring is cemented. The central region of rign 50 is provided with an annular recess 52, the bottom wall of which has ninety-six perforations 53 in registry with the ninety-six grid perforations 49 above described. A series of successive annular electrodes 54—57 similar to electrode 50 are mounted in spaced relation to each other. These successive electrodes are spaced apart at their inner flanges by respective ceramic insulator rings 58—61. Likewise, each of the rings 50, 54, 55, 56 and 57 has a set of six aligned openings to receive the ceramic rods 27 to which they are also cemented thus preserving a predetermined fixed spacing between the successive electrodes. The recessed portions of the rings 54 and 55 are united by an inner cylindrical metal wall 62 and an outer cylindrical metal wall 63 to define an annular electrode chamber of the Faraday cage type.

Each of the ring electrodes is provided with a respective lead-in wire and connected to corresponding prongs 11 for applying respective positive potentials to the said electrodes. In accordance with well-known principles of electron lens design, the electrons emitted by the cathode pass through the aligned perforations in the various rings and emerge as ninety-six separate focused electron beams. In other words, ninety-six separate focused beams are produced, all of which normally are located the same radial distance from the central longitudinal distance of the mount. These ninety-six beams, if not otherwise cut off, therefore, appear as ninety-six equally spaced luminescent spots on the fluorescent screen on the end wall 14 of the tube.

In order that each one of the ninety-six beams can be individually controlled either as to intensity or in order to cut off each beam, each of the grid strips 39 is provided with a corresponding lead-in conductor which is connected to a corresponding one of the prongs 11. Each of the prongs 11 is connected to a corresponding one of a circular array of pick-up elements or receiving transducers 75, 76, 77, etc., such as are well-known in the radar and sonar arts, and as schematically shown in Fig. 10.

In order to control the radial position of each beam in accordance with the range signal from the corresponding pick-up transducer unit, there is provided an annular beam deflecting system which is common to all the beams. This system consists of an inner metal member 62 having a cylindrical wall portion 63 and a frusto-conical portion 64 terminating in a flat flange 65 which is cemented to the glass member 24. A ceramic sleeve 66 accurately spaces the member 62 from the electrode 57. The member 62 is provided with a lead-in member 67 which is connected to a corresponding contact prong 11 in the header 10. Another outer deflecting member 68 is provided having a cylindrical portion 69 of larger diameter than the portion 63 of member 62, thus defining a cylindrical annular chamber in alignment with the beam openings in the preceding ring electrodes. The member 68 also has an outwardly extending frusto-conical portion 70 having a flange 71 which is cemented to the ceramic rods 27. This flange is provided with a lead-in wire 72 which is connected to the corresponding prong 11. The members 62 and 68 thus define an annular beam deflecting system which is common to all the ninety-six beams. The relative potential difference between the members 62 and 68 at any given instant determines the radial position of the corresponding fluorescent spot on the fluorescent screen.

Figure 10:
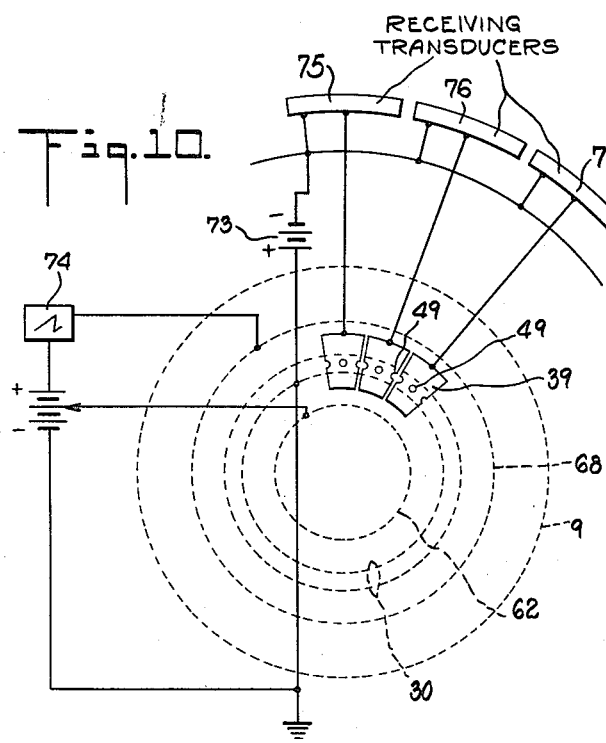
Fig. 10 is a generalized schematic wiring diagram of a search system using the tube according to the invention.

Referring to Fig. 10, there is shown one typical manner of using the tube according to the invention to display the bearing and range indications of distant objects.

In Fig. 10, the cathode 30 and the annular deflecting electrodes 62 and 68 are schematically represented by dotted lines and, for simplicity, only three of the grid strips and their corresponding grid perforations, and only three pick-up units 75, 76, 77, are shown. It will be assumed that the forty-eight grid strips 39 are connected by respective conductors each to a corresponding pick-up transducer unit of any well-known form, these units being arranged, for example, in a circular array for scanning in azimuth, or the like. The transducer units may be keyed on and off by sonar or radar range signal pulses, and the voltage pulse picked up by each transducer unit is impressed on its corresponding grid strip. Preferably, each grid strip is negatively biased by means of the direct current potential source 73, so that the beam from the cathode 30 is normally blanked off from the screen 14a. On the other hand, when a pick-up transducer unit is energized by a sonar signal pulse from the distant object a sufficient positive voltage is developed so as to bias the corresponding grid strip 39 to a potential to allow the beam from the cathode to pass through the corresponding grid perforation 49 and to illuminate the screen 14a. In accordance with standard practice the deflector member 68 can be energized from a source of saw-tooth sweep voltage 74, whose time base between zero and maximum voltage is correlated with the limits of the range to be read on the scope. For example, in well-known sonar technique a superaudible pulse is transmitted and the zero of the saw-tooth wave 74 is timed with the instant of transmission. The reflected pulses from the various distant objects at different ranges will have times of arrival at the respective pick-up units 75, 76, 77, etc., which will be correlated with the value at any given instant of the saw-tooth sweep voltage. This value of sweep voltage is applied to the deflector 68 and thus, in effect, tests for the presence of reflected objects at continuously increasing distances. It will be understood, of course, that if radar pulses are transmitted the radar transmitter may be of the omni-directional type. If desired, each unit may consist of an individual pulse transmitter and associated echo pulse receiver. The echo or sonar voltage pulse, which is applied at any given instant to a grid strip 39, will key the corresponding beam on, and the radial position of the spot on screen 14a will be a function of the distance or range of the object. The angular position of the said object will then be determined by the particular transducer unit that is energized by the reflected beam. Instead of using a single omnidirectional transmitter, each transducer unit may have an individual transmitter and receiver. Fig. 7 shows the appearance of the displays on the screen 14a on the assumption that there are forty-eight transducer units. However, in the particular display shown in Fig. 7, only search units 1, 2, 5, 9, 30 and 46 are energized by objects in direct line therewith. As well-known in the sonar art, each of these transducers has a highly directional field sensitivity pattern as represented by the curves 78, 79, 80 (Fig. 11) for the three successive receiving transducers 75, 76, 77. For purposes of subsequent explanation it will be assumed that three different objects, A, B, C, are in the positions shown in Fig. 11 with respect to the ring of transducers. There will be produced on the screen 14a of the cathode-ray tube corresponding visual displays. Since the object A is in direct line with unit 75, it is represented by the corresponding high intensity spot $a_1$, whose radial distance from the center of the screen indicates the range, and whose angular position indicates the bearing.

The object B is assumed to have a bearing halfway between the units 75, 76, in which case the echo voltage pulse, instead of being applied to only one grid strip, causes two adjacent grid strips to be energized. However, because of the field sensitivity characteristic of the two adjacent pick-up units the voltages applied to these two adjacent grid strips will be less than the maximum voltage which is applied in the case of object A, which is in direct line with a pick-up unit. However, at the range of object B the next pair of grid strips on opposite sides of the said two energized grid strips are at cut-off. The net result is that three spots will appear on screen 14a. The center one of these spots $b_1$ will be produced by the corresponding keyed-on beam which passes through the interpolation grid opening between the spaced edges of the two adjacent keyed-on grid strips. The two remaining spots $b_2$, $b_3$, will be controlled by the openings in the body in each of the said two keyed-on grid strips. However, since the next succeeding and next preceding grid strips are at cut-off, the net result is that the intensity of the two supplementary spots $b_2$, $b_3$ is much less than the intensity of the main spot $b_1$. Thus, the observer reading this display knows, from what may be termed the "center of gravity" or light intensity distribution of the triple spot display, that the object B is halfway between units 75 and 76. Therefore, in the case of forty-eight transducer units the observer knows that the object B has a bearing of 3¾ degrees.

If the object C is located with a bearing between objects A and B, because of the field sensitivity patterns of the transducers 75, 76, the grid strip connected to unit 75 will receive a greater voltage pulse than the grid strip connected to unit 76. There will then be produced three spots $c_1$, $c_2$, $c_3$, but the spot corresponding to unit 75 will be of much higher intensity than the spots $c_2$, $c_3$. However, the intensity of spot $c_1$ will not be as great as if the object were in a direct line with unit 75. Since the observer sees three spots $c_1$, $c_2$, $c_3$, he knows that the object is between 0 degrees and 7½ degrees bearing but is closer to 0 degrees bearing than it is to 3¾ degrees bearing. Thus, here again the observer can interpolate from the "center of gravity" or light distribution of the luminous display the position of the object at various bearings between 0 degrees and 7½ degrees. Since the object D is in direct line with unit 76, only a single high intensity spot $d_1$ appears.

What is claimed is:

1. A cathode-ray tube comprising a cathode for emitting electrons in a substantially cylindrical conformation, a plurality of individual grid electrodes arranged in substantially planar array around a longitudinal axis of the tube, a plurality of electron focusing rings in successive spaced relation to each other and to said grid members each ring having a series of electron lens apertures with each aperture in alignment with a corresponding grid member, and a beam deflecting system common to all said grid members and mounted around said tube axis, said deflecting system including a pair of spaced deflector plates defining an annular beam deflecting region through which the electrons from said lens apertures pass and for deflection perpendicular to said axis.

2. A cathode-ray tube comprising a cathode for emitting electrons in a substantially cylindrical conformation, a series of individual grids in substantially planar array around a longitudinal axis of the tube, a plurality of successive ring electrodes each having a series of apertures with the apertures in successive rings in alignment with each other and with said grids to form said electrons into a corresponding plurality of separate focused beams, and a deflecting system common to all said beams and comprising a first deflecting plate having a portion extending along said axis and around said axis, and a second deflecting plate also having a portion extending along said axis and around said axis but spaced from said first plate to define an annular beam deflecting region through which all said beams pass and for deflection radially with respect to said axis.

3. A cathode-ray tube comprising an electron emitting ring-shaped cathode for emitting a substantially continuous cylindrical cathode-ray beam, a series of apertured grid strips arranged in substantially planar array around the axis of said cylindrical beam each strip having a grid aperture for sub-dividing said cylindrical beam into a series of discrete beams, a plurality of successively spaced ring electrodes also surrounding said axis each ring having a series of beam focusing apertures with all the apertures in successive rings in alignment with each other and with the apertures in said grid strips, and an annular beam deflecting system common to all said sub-divided beams for deflecting the beams radially with respect to said axis.

4. A cathode-ray tube comprising a central support member, a plurality of lateral support members extending parallel to said central member, a ring-shaped cathode surrounding said central member and insulatingly supported between said central member and said lateral members, a plurality of discrete conductive strips also insulatingly supported between said central member and said lateral members, all said strips being arranged in substantially planar array and extending radially from said central member, each of said strips being spaced from adjacent strips and each strip having at least one grip aperture to divide the electrons from said ring-shaped cathode into respective discrete beams, a series of electron focusing rings insulatingly supported between said central and lateral members, each focusing ring having a series of apertures each in alignment with a corresponding grid aperture, an inner cylindrical beam-deflecting plate insulatingly supported from said central member and other cylindrical beam-deflecting plate insulatingly supported from said lateral members, said plates forming an annular beam deflecting region through which all said discrete beams pass for radial deflection.

5. A cathode-ray tube according to claim 4 in which the means for supporting said ring cathode comprises an inner ceramic ring anchored to said central support member, an outer ceramic ring anchored to said lateral members to define an annular gap between the rings, and spoke-like projections from said ring cathode anchored respectively to said inner and outer ceramic rings with the ring cathode located in said annular gap.

6. A cathode-ray tube according to claim 4 in which said conductive strips are cemented to the flat surfaces of two spaced insulator rings one of said insulator rings being anchored to said central support and the other insulator ring being anchored to said lateral supports to provide an annular gap between the insulator rings, the apertures in said grid strips being in registry with said annular gap, and means extending radially from said ring-shaped cathode for anchoring said cathode to said insulator rings with the electron emissive surface of the cathode in registry with all said grid apertures.

7. A cathode-ray tube according to claim 6 in which the adjacent edges of succesive conductive grid strips have adjacent notches to form an interpolating grid aperture between said adjacent strips, and each of said focusing rings has a series of apertures with alternate apertures in alignment with the apertures in the body of the grid strips and the intervening apertures in alignment with the interpolating apertures.

8. An electrode mount for cathode-ray tubes comprising a ring cathode, electron control means defining a series of grid apertures arranged in a circle of substantially the same diameter as said ring cathode, said means including a series of discrete radially extending conductive strips each strip having a grid aperture in the body thereof and a grid notch in the edge thereof, means to support said control means as a unit with said cathode, a series of multi-beam focusing electrodes for the electrons emerging from each of said grid apertures, and an annularly arranged beam deflecting system common to all the beams and through which said beams pass for radial deflection.

9. An electrode mount for cathode-ray tubes according to claim 8, in which the means to support the ring cathode and the control means as a unit comprises a header, a central insulating member, and a plurality of lateral insulating members supported from said header, a first ceramic ring fastened to said central support, a second ceramic ring substantially co-planar with the first ceramic ring and fastened to said lateral supports, said conductive strips being cemented to the top flat faces of said rings with the grid apertures located in the annular gap between said ceramic rings and means for attaching said ring cathode to the under-faces of said ceramic rings with the said ring cathode located in said gap in registry with said grid apertures.

10. A metal blank for forming a multi-beam grid unit for a cathode-ray tube of the type described, comprising an inverted annular metal cup-like member having a series of radial slots extending from the inner peripheral wall of the annular cup to the outer peripheral wall of the annular cup, each slot extending part-way down the said inner wall and part-way down the outer wall.

11. A blank according to claim 10 in which the portion of the flat wall of said blank between said slots is provided with a grid perforation and the adjacent edges of each slot are provided with corresponding notches to define a grid aperture all of said apertures being arranged in a circular array.

12. In a range and bearing system of the echo type, the combination of a plurality of pick-up transducer units arranged in a ring, a cathode-ray tube having a fluorescent display screen, a plurality of separate grid members arranged in a ring around the central axis of the tube, each grid member having a main grid aperture in the body thereof and notches in its opposite edges in circumferential alignment with the main grid aperture to form with the corresponding notches on the adjacent grid members interpolating grid apertures, means connecting each of said grid members to a corresponding one of said transducer units, annular beam-deflecting electrodes surrounding all said apertures, and means to energize said beam-deflecting electrodes from a source of time-base sweep voltage.

No references cited.